US007785750B2

(12) United States Patent
El Moussaoui et al.

(10) Patent No.: US 7,785,750 B2
(45) Date of Patent: Aug. 31, 2010

(54) SOLID ALKALINE FUEL CELL COMPRISING ION EXCHANGE MEMBRANE

(75) Inventors: Rachid El Moussaoui, Brussels (BE); Roland Martin, Sint-Stevens-Woluwe (BE)

(73) Assignee: SOLVAY (Societe Anonyme), Brussels (BE)

(*) Notice: Subject to any disclaimer, the term of this patent is extended or adjusted under 35 U.S.C. 154(b) by 321 days.

(21) Appl. No.: 11/630,994

(22) PCT Filed: Jul. 1, 2005

(86) PCT No.: PCT/EP2005/053136

§ 371 (c)(1),
(2), (4) Date: Dec. 28, 2006

(87) PCT Pub. No.: WO2006/003182

PCT Pub. Date: Jan. 12, 2006

(65) Prior Publication Data

US 2008/0124604 A1    May 29, 2008

(30) Foreign Application Priority Data

Jul. 2, 2004   (EP)   ................................ 04103145

(51) Int. Cl.
  *H01M 8/10* (2006.01)
(52) U.S. Cl. .................................................. 429/492
(58) Field of Classification Search ........................ None
  See application file for complete search history.

(56) References Cited

U.S. PATENT DOCUMENTS

| 3,282,875 | A | | 11/1966 | Connolly et al. | |
| 4,217,421 | A | | 8/1980 | Beasley | |
| 4,433,082 | A | | 2/1984 | Grot | |
| 2003/0049509 | A1 | * | 3/2003 | Divisek | ....................... 429/30 |
| 2004/0029015 | A1 | * | 2/2004 | Inagaki et al. | ................ 429/317 |
| 2004/0224201 | A1 | * | 11/2004 | St-Pierre et al. | ................ 429/26 |

FOREIGN PATENT DOCUMENTS

| EP | 0 166 015 | 1/1986 |
| EP | 1 179 548 | 2/2002 |
| JP | 01 311 132 | 12/1989 |
| WO | 00 57995 | 10/2000 |

OTHER PUBLICATIONS

E. Agel, et al., "Characterization and Use of Anionic Membranes for Alkaline Fuel Cells", Journal of Power Sources, vol. 101, No. 2, XP 004318374, pp. 267-274, 2001.

(Continued)

*Primary Examiner*—Patrick Ryan
*Assistant Examiner*—Muhammad Siddiquee
(74) *Attorney, Agent, or Firm*—Oblon, Spivak, McClelland, Maier & Neustadt, L.L.P.

(57) ABSTRACT

The present invention provides solid alkaline fuel cells comprising anion exchange membranes which comprise diamines or polyamines coupled to a support polymer via a sulfonamide linkage. At least one nitrogen atom of the diamine or polyamine is a quaternized nitrogen atom acting as an anion exchange group. The anion exchange membrane exhibits favourable properties that render it suitable for use in a solid alkaline fuel cell.

10 Claims, 3 Drawing Sheets

OTHER PUBLICATIONS

Qingfeng Li, et al., "Approaches and Recent Development of Polymer Electrolyte Membranes for Fuel Cells Operating Above 100° C.", Chemical Materials, vol. 15, No. 26, pp. 4896-4915, 2003.
O. Savadogo, et al., "Hydrogen/Oxygen Polymer Electrolyte Membrane Fuel Cell (PEMFC) Based on Acid-Doped Polybenzimidazole (PBI)", Journal of New Materials for Electrochemical Systems, vol. 3, pp. 343-347, 2000.
File Caplus, 2002:951808.

* cited by examiner

SOLID ALKALINE FUEL CELL COMPRISING ION EXCHANGE MEMBRANE

The present invention relates to solid alkaline fuel cells comprising special ion exchange membranes. The invention relates also to some ion exchange membranes particularly adapted to solid alkaline fuel cells.

Fuel cell technology has attracted considerable interest in recent years. In the simplest case, fuel cells comprise two electrically conductive electrodes which are separated from one another by an ion-conducting membrane. The reaction media, e.g. hydrogen and oxygen, are fed via integrated gas or liquid feeding ducts.

Most polymer electrolyte membranes which are presently used in fuel cells are proton exchange membranes and are based on perfluorosulfonic acid (PFSA) polymers as electrolyte operating at a typical temperature of below 100° C. A typical example of such a perfluorosulfonic acid (PFSA) polymer membranes is the product Nafion®, which is widely used in fuel cells. Examples of perfluorinated polymers are described in U.S. Pat. Nos. 3,282,875, 4,433,082 and EP 1179548 A1. Although some success has been achieved with such membranes, several drawbacks exist in addition to the high costs.

In order to maintain good conductivity, membranes of the Nafion®-type require humidification of the gases and a sophisticated water management in the fuel cell. During operation of a proton exchange membrane fuel cell (PEMFC), the electroosmotic drag (EOD) causes dehydration of the membrane of the anode side and consequently a dramatic decrease of the conductivity. Moreover, any change in the water content will result in swelling and shrinkage of membranes, which can lead to the deterioration of the membrane-catalyst interface or even membrane breakage. As a result, an effective and intensive humidification of both the fuel steam and the oxidant is needed. Therefore, one major drawback of PFSA membranes is their low conductivity and therefore poor performance under low humidification and at elevated temperatures (above 90° C.) because of the water loss (Chem. Mater. 2003, 15, 4896-4915).

Numerous modifications have been made to PFSA membranes ("modified PFSA membranes"). For example, replacement of water with nonaqueous and low-volatile media has been explored. Further approaches include reducing the thickness of membranes, impregnating the membranes with hygroscopic oxide nanoparticles, and solid inorganic proton conductors (Chem. Mater. 2003, 15, 4896-4915).

Development of alternative sulfonated polymer membranes as alternatives to PFSA has been another active area. As starting materials, basic polymers should have high chemical and thermal stability. Two main groups of polymers have been widely investigated for this purpose. One group is polymers containing inorganic elements, i.e., fluorine in fluoropolymers and silicon in polysiloxanes. The other group is aromatic polymers with phenylene backbones. The latter group includes sulfonated polysulfones (sPSF), sulfonated polyetheretherketones (sPEEK) and polybenzimidazoles (PBI). Aromatic polycondensates are described in Journal of New Materials for Electrochemical Systems I (1998), 47-66 and in Chem. Mater. 15 (2003), 4896-4915.

Acid-base complexation represents a further approach to development of proton-conducting membranes. Basic polymers can be doped with an amphoteric acid, which acts both as a donor and an acceptor in proton transfer and therefore allows for the proton migration. $H_3PO_3$-doped PBI has received much attention in the past few years (Journal of New Materials for Electrochemical Systems 3 (2000) 345-349).

Radiation grafting is another possibility to prepare ion exchange membranes. Radiation grafting has been investigated for many years with the objective to prepare polymeric ion exchange membranes for fuel cells and other electrochemical applications.

Direct use of methanol as fuel in a fuel cell is an attractive option for propulsion of vehicles and other purposes. However, the direct methanol fuel cell (DMFC) technology is far from satisfactory, mainly because of (1) the low activity and high costs of methanol oxidation catalysts and (2) shortcomings of the ion-conducting membranes which are used in the known fuel cells. Most membranes have a large methanol crossover rate resulting in a substantial reduction of the operational voltage that can be achieved. Due to the mixed cathode potential this results not only in waste of fuel but also in a considerably lowered energy efficiency and cell performance. Furthermore, the anodic catalyst often is not sufficiently active, leading to a high anodic over-potential loss. A major drawback of Nafion®-type membranes is the high methanol crossover rate when using direct methanol (Chem. Mater. 2003, 15, 4896-4915).

It is well known that electrocatalysts have much higher activity in alkaline media, both on the cathode side and on the anode side.

Solid alkaline fuel cells (SAFC) in particular, having a solid polymer as electrolyte, appear most promising in various applications. Besides a higher activity of the catalysts, which renders possible to avoid in some circumstances the use of expensive noble metals, SAFC do not have the disadvantages related to the poisoning of the electrodes and the electrolyte with CO2.

Ion exchange membranes for SAFC however require a lot of properties. Among them, are required: good mechanical resistance, dimensional stability, chemical resistance (in particular against alkalis and alcohols), good electrical conductivity (ion exchange capacity) and low permeability in order to reduce the fuel crossover.

SAFC of the prior art, as disclosed for instance in Agel et al.(2001) Journal of Power Source 101, 267, do not present a satisfactory compromise between those required properties.

The invention aims at developing SAFC whose properties can be tailor made in order to achieve for each application the best compromise between the required properties discussed above.

The invention therefore relates to a solid alkaline fuel cell comprising an anion exchange membrane which comprises a support polymer and groups of formula (I)

$$-SO_2-NR^1-Q^+ \qquad (I)$$

covalently bonded to the support polymer, wherein

$Q^+$ is a group comprising at least one quaternized nitrogen atom, and $R^1$ is H or a $C_{1-20}$ alkyl group, or forms a ring together with a group in $Q^+$, wherein the ring contains 2 to 10 carbon atoms and, optionally, up to 4 heteroatoms.

It has surprisingly be found that, owing in part to the versatility of the bond between group (I) and a vast variety of support polymers, SAFC according to the invention are best suited in order to achieve the properties required by each application.

Preferably, the solid alkaline fuel cell comprises an anion exchange membrane which comprises a support polymer and groups of formula (II)

(II)

covalently bonded to the support polymer, wherein

Y is a $C_{6-10}$ aryl group, a heteroaryl group or $CR^7R^8$ wherein $R^7$ is H, a halogen atom or a $C_{1-20}$ alkyl group or forms a ring together with one of $R^2$, $R^5$, or $R^8$, and $R^8$ is H, a halogen atom or a $C_{1-20}$ alkyl group or forms a ring together with one of $R^3$, $R^6$, or $R^7$, each of the rings formed by $R^7$ or $R^8$ containing 2 to 10 carbon atoms and optionally 1 to 4 heteroatoms, and the heteroaryl group contains 5 to 10 ring atoms, $R^1$ is H or a $C_{1-20}$ alkyl group, or forms a ring together with one of $R^2$ or $R^5$, wherein the ring contains 2 to 10 carbon atoms and 1 to 4 heteroatoms, $R^2$ is a $C_{1-20}$ alkyl group or forms a ring together with one of $R^1$, $R^3$, $R^5$, $R^7$ or $R^9$, wherein the ring contains 2 to 10 carbon atoms and 1 to 4 heteroatoms, $R^3$ is a $C_{1-20}$ alkyl group or forms a ring together with one of $R^2$, $R^6$, $R^8$ or $R^{10}$, wherein the ring contains 2 to 10 carbon atoms and 1 to 4 heteroatoms, $R^4$ is a $C_{1-20}$ alkyl group, $R^5$ is H, a halogen atom or a $C_{1-20}$ alkyl group, or forms a ring together with one of $R^1$, $R^2$, $R^7$ or $R^9$, wherein the ring contains 2 to 10 carbon atoms and optionally 1 to 4 heteroatoms, $R^6$ is H, a halogen atom or a $C_{1-20}$ alkyl group, or forms a ring together with one of $R^3$, $R^8$ or $R^{10}$, wherein the ring contains 2 to 10 carbon atoms and optionally 1 to 4 heteroatoms, each $R^9$ is independently H, a halogen atom or a $C_{1-20}$ alkyl group, or forms a ring together with one of $R^2$ or $R^5$, wherein the ring contains 2 to 10 carbon atoms and optionally 1 to 4 heteroatoms, each $R^{10}$ is independently H, a halogen atom or a $C_{1-20}$ alkyl group, or forms a ring together with one of $R^3$ or $R^6$, wherein the ring contains 2 to 10 carbon atoms and optionally 1 to 4 heteroatoms, n is an integer from 0 to 4, and wherein the ring structures in the group of formula (II) can be bridged by $C_{1-4}$ alkylene groups.

The invention concerns also anion exchange membranes comprising a support polymer and groups of formula (III)

(III)

covalently bonded to the support polymer, wherein

Y is a $C_{6-10}$ aryl group, a heteroaryl group or $CR^7R^8$ wherein $R^7$ is a halogen atom or a $C_{1-20}$ alkyl group or forms a ring together with one of $R^2$, $R^5$, or $R^8$, and $R^8$ is a halogen atom or a $C_{1-20}$ alkyl group or forms a ring together with one of $R^3$, $R^6$, or $R^7$, each of the rings formed by $R^7$ or $R^8$ containing 2 to 10 carbon atoms and optionally 1 to 4 heteroatoms, and the heteroaryl group contains 5 to 10 ring atoms, $R^1$ is H or a $C_{1-20}$ alkyl group, or forms a ring together with one of $R^2$ or $R^5$, wherein the ring contains 2 to 10 carbon atoms and 1 to 4 heteroatoms, $R^2$ is a $C_{1-20}$ alkyl group or forms a ring together with one of $R^1$, $R^3$, $R^5$, $R^7$ or $R^9$, wherein the ring contains 2 to 10 carbon atoms and 1 to 4 heteroatoms, $R^3$ is a $C_{1-20}$ alkyl group or forms a ring together with one of $R^2$, $R^6$, $R^8$ or $R^{10}$, wherein the ring contains 2 to 10 carbon atoms and 1 to 4 heteroatoms, $R^4$ is a $C_{1-20}$ alkyl group, $R^5$ is H, a halogen atom or a $C_{1-20}$ alkyl group, or forms a ring together with one of $R^1$, $R^2$, $R^7$ or $R^9$, wherein the ring contains 2 to 10 carbon atoms and optionally 1 to 4 heteroatoms, $R^6$ is H, a halogen atom or a $C_{1-20}$ alkyl group, or forms a ring together with one of $R^3$, $R^8$ or $R^{10}$, wherein the ring contains 2 to 10 carbon atoms and optionally 1 to 4 heteroatoms, each $R^9$ is independently H, a halogen atom or a $C_{1-20}$ alkyl group, or forms a ring together with one of $R^2$ or $R^5$, wherein the ring contains 2 to 10 carbon atoms and optionally 1 to 4 heteroatoms, each $R^{10}$ is independently H, a halogen atom or a $C_{1-20}$ alkyl group, or forms a ring together with one of $R^3$ or $R^6$, wherein the ring contains 2 to 10 carbon atoms and optionally 1 to 4 heteroatoms, n is an integer from 0 to 4, and wherein the ring structures in the group of formula (III) can be bridged by $C_{1-4}$ alkylene groups, with the proviso that $R^7$ and $R^8$ are not methyl or ethyl if $R^7=R^8$.

Those membranes are characterized by the fact that they do not have hydrogen in beta position ($R^7$). They exhibit superior resistance in alkali media For those membranes, it is recommended to avoid in certain circumstances groups corresponding to amines belonging to the class of unsubstituted methylpiperazines.

A $C_{6-10}$ aryl group is an unsubstituted or substituted aromatic ring system such as phenyl, naphthyl, and the like. The aromatic ring system comprises at least 6 and no more than 10 ring atoms. Preferably, the aromatic ring system comprises 6 ring atoms. The $C_{6-10}$ aryl group may be substituted by 1 to 3 substituent groups such as $C_{1-6}$ alkyl and/or halogen. Preferred substituents are methyl, ethyl, F and Cl.

The term "heteroaryl" denotes an optionally substituted aromatic heterocycle having 5 to 10 ring atoms. The aromatic heterocycle may have 1 to 4, preferably 1 to 3 heteroatoms (N, S and/or O). The heterocycle may comprise 1 or 2 aromatic rings which can be fused. Preferred heteroaryl groups have 5 to 7 ring atoms, more preferably 5 or 6 ring atoms. Suitable examples include pyridyl, pyrazinyl, pyridazinyl, pyrazolyl imidazolyl thiazolyl, oxazolyl piperidyl, piperazinyl, morpholinyl indolyl, and the like. The aromatic heterocycle may be substituted by 1 to 3 substituent groups such as $C_{1-6}$ alkyl and/or halogen. Preferred substituents are methyl, ethyl, F and Cl.

A $C_{1-20}$ alkyl group can be branched or unbranched, preferred is a $C_{1-10}$ alkyl group, more preferred is a $C_{1-5}$ alkyl group. $C_{1-20}$ alkyl groups include methyl, ethyl propyl, isopropyl, butyl isobutyl sec-butyl tert-butyl, pentyl, isopentyl, neopentyl, hexyl, heptyl, octyl, nonyl, decyl, and the like. The term alkyl includes cycloalkyl groups of 3 to 7 carbon atoms, such as cyclopropyl cyclobutyl, cyclohexyl, cycloheptyl, and the like. The alkyl groups may be substituted or unsubstituted. Possible substituents include halogens (e.g. fluorine, chlorine, bromine and iodine) and aryl groups Preferred alkyl groups are methyl, ethyl, propyl, and isopropyl, more preferred are methyl and ethyl, most preferred is methyl.

The phrase "$R^x$ forms a ring together with $R_y$" refers to a situation where two residues $R^x$ and $R^y$ are fused to form a cyclic structure in the molecule, said cyclic structure consisting of $R^x$, $R^y$ and other atoms in the same molecule. Usually, the cyclic structure is a 4- to 14-membered cyclic structure, i.e. the cyclic structure has at least 4 and no more than 14 ring atoms. Preferably, the cyclic structure has at least 5 and no more than 8 ring atoms, more preferably the cyclic structure has 5 or 6 ring atoms. Bicyclic and tricyclic structures are included. $R^x$ and $R^y$ together are preferably an alkylene group in which one carbon atom may be replaced with a heteroatom (N, S or O with N being preferred). The ring structures in the moiety of formula (II) can be bridged by a $C_{1-4}$ alkylene group.

n is an integer from 0 to 4, preferably from 0 to 3. Most preferably, n is 0, 1 or 2. Each $R^9$ is independently H, a halogen atom or a $C_{1-20}$ alkyl group, or forms a ring together with one of $R^2$ or $R^5$, and each $R^{10}$ is independently H, a halogen atom or a $C_{1-20}$ alkyl group, or forms a ring together with one of $R^3$ or $R^6$, each of the rings formed by $R^9$ or $R^{10}$ containing 2 to 10 carbon atoms and optionally 1 to 4 heteroatoms. Preferred substituents $R^9$ and $R^{10}$ are H, methyl, ethyl, propyl, or halogen. Examples of $(CR^9R^{10})_n$ are methylene, ethylene, propylene or butylene.

Y may be an optionally substituted $C_{6-10}$ aryl group or heteroaryl group, e.g. phenylene, pyridyl, and the like. Preferably, Y is a phenylene group being substituted with 1, 2, 3 or 4 alkyl groups, e.g. methyl or ethyl. Alternatively, Y can be $CR^7R^8$, wherein $R^7$ is H, a halogen atom or a $C_{1-20}$ alkyl group or forms a ring together with one of $R^2$, $R^5$, or $R^8$, and $R^8$ is H, a halogen atom or a $C_{1-20}$ alkyl group or forms a ring together with one of $R^3$, $R^6$, or $R^7$, each of the rings formed by $R^7$ or $R^8$ containing 2 to 10 carbon atoms and optionally 1 to 4 heteroatoms, In a specific embodiment $R^1$ is H or a $C_{1-20}$ alkyl group, $R^2$, $R^3$ and $R^4$ independently are a $C_{1-20}$ alkyl group, $R^5$ and $R^6$ are H. $R^9$ or $R^{10}$ are H, Y is a $C_{6-10}$ aryl group, a heteroaryl group or $CR^7R^8$ wherein $R^7$ and $R^8$ independently are H, a halogen atom or a $C_{1-20}$ alkyl group, and n is an integer from 0 to 2.

Unexpectedly, it has further been found that the resulting anion exchange membrane exhibits even more improved properties if the chain between the quaternary ammonium group and the sulfonamide group lacks an acidic hydrogen atom at the β-carbon atom.

In one embodiment, the group Y is therefore a $C_{6-10}$ aryl or a heteroaryl group or $CR^7R^8$ wherein $R^7$ and $R^8$ independently are a halogen atom or a $C_{1-20}$ alkyl group. In one embodiment, Y is $CR^7R^8$, and $R^7$ and $R^8$ independently are F or Cl. In another embodiment, Y is $CR^7R^8$, and $R^7$ and $R^8$ independently are methyl, ethyl or propyl.

The precursor of the anion exchange membrane in accordance with this invention can be easily obtained by chlorosulfonation, applicable to a wide variety of known polymers ("support polymer"), e.g. by immersion of a support film into an excess of the solution of chlorosulfonic acid in 1,2-dichloroethane.

Alternatively, the halosulfonyl precursor polymer may be obtained with superior structure control by direct copolymerization or polycondensation of suitable functionalized monomers. The precursor polymer can be formed into a film using techniques well known to those skilled in the art, e.g. extrusion or solution casting processes.

The halosulfonyl function may then be aminated by contacting the polymer with a suitable diamine or polyamine resulting in a sulfonamide structure. In a further step, the membrane is then quaternized by exposing it to an excess of alkyl halogenide. The anion exchange membrane is advantageously used in the OH⁻ form that may be obtained by conditioning the membrane in aqueous alkali solution, e.g. NaOH or KOH.

Suitable diamines or polyamines can be directly derived from the structure of formula (II). For example, suitable diamines or polyamines have the following formula (IV):

wherein the meaning of $R^1$, $R^2$, $R^3$, $R^5$, $R^9$, $R^{10}$, Y and n is as defined supra.

The diamine or polyamine employed to introduce the ammonium cationic sites is characterized by the presence of at least one primary (or secondary, depending on $R^1$) amine group reacting with the sulfonyl function and of at least one tertiary amine group (to be quaternized in the final step).

Preferably, the quaternary ammonium groups in the ion exchange membrane are "regenerable", stable quaternary ammonium groups, i.e. degradation is reduced to the loss of alkyl groups $R^2$, $R^3$, $R^4$ as alcohol. This loss of alkyl groups is reversible by treatment with an alkylation agent such as $R^4$—Cl or $R^4$—Br or $R^4$—I, wherein $R^4$ is an alkyl group, preferably methyl or ethyl. The general strategy for structure selection is to minimize the rupture of the C—N bond (bond between quaternary N and Cα) assuring the permanent attachment of the ammonium group to the support polymer. The methyl group is selected as most stable pending alkyl group linked to ammonium Stable quaternary ammonium groups can be obtained by using preferred diamines or polyamines of the following classes:

α-(dimethylamino)-β, β-dialkyl-ω-aminoalkyls (for example (2))

2-alkyl-4-ω aminoalkyl-N,N-dimethylaminobenzyls and 2,6-dialkyl-4-amino-N,N-dimethylaminobenzyls (for example (3))

1-methylpiperazines, mono- and/or disubstituted by alkyl groups in position 2 and/or 6 (for example (1), (4))

1-(ω-aminoalkyl)piperazines, mono- and/or disubstituted by alkyl groups in position 2 and/or 6 (for example (6)), 2 ammonium groups/attachment "bridged aminopiperazine", especially for example (9), giving rise to 2 ammonium groups/attachment 1-methyl-4(ω-aminoalkyl)-3,5-alkyl (mono, di) piperidines (for example (5))

1-methyl (or H)-2,6 alkyl (mono, di, tri or tetra)-4-aminopiperidines (for example (7))

"bridged aminopiperidine", especially for example (8)

1-methyl-3-aminopyrrolidines, optionally alkyl substituted in 2- and/or 5-position, for example (11)

4-(ω-aminoalkyl)morpholine, alkyl substituted in position 3 and/or 5, for example (12)

"aza-aminoadamantanes", especially or example (10)

Specific examples of these classes of diamines or polyamines are the following compounds (2) to (12):

N,N,2,2-tetramethyl-1,3-propanediamine (2)

2,6-dimethyl-4-amino-N,N-dimethylbenzylamine (3)

1,2,6-trimethylpiperazine (4)

1,3,5-trimethyl-4-aminomethylpiperidin (5)

1,3,5-trimethyl-4-(2-aminoethyl)piperazine (6)

4-amino-2,2,6,6-tetramethylpiperidine (7)

3-aminoquinuclidine (8)

(1-aza-bicyclo[2.2.2]-3-aminononane)
1,4-diaza-bicyclo[2.2.2]-aminooctane (9)

1,3,5-Triaza-tricyclo[3.3.1.1*3,7*]dec-7-ylamine (10)

3-amino-1-methylpyrrolidine (11)

4-(2-aminoethyl) 2,6 dimethyl morpholine (12)

In another preferred embodiment, the ion exchange membrane has cross-linked membrane structures such that mechanical properties and dimensional stability (swelling) are improved. The cross-linking can be obtained by use of suitable mixtures of stable diamines or polyamines including a certain proportion of primary (or secondary) diamines or polyamines. Non-limiting examples are the following compounds (13) and (14).

2,6-dimethyl piperazine (13)

2,2-dimethyl-1,3-propanediamine (14)

After reacting the diamine or polyamine with the sulfonyl function the tertiary amino group in the resulting sulfonamide can be quaternized by usual alkylation agents. Suitable alkylation agents are alkyl halogenides such as alkylchloride, alkyliodide and the like. Preferred are $C_{1-3}$ alkylhalogenides, most preferred are methyliodide and methylchloride.

In general, uses of polyamines are preferred because they give rise to ion exchange membranes having a greater density of exchange sites per unit volume. This is particularly useful in SAFC because the higher density of exchange sites can then compensate for the poor mobility of the $OH^-$ ions compared to the proton mobility in proton exchange membranes.

Use of polyamines also allows to reticulate the membrane at the same time as it is reacted with the polyamine.

Various support polymers which are principally known in the prior art can be used in accordance with the present invention. The term "support polymer" denotes a polymer which is in the form of a thin film. The group of formula (I), (II), or (III) is covalently linked to the support polymer. Sometimes in the prior art the term support polymer is used for the reactive precursor including sulfonic acid, halosulfonyl or sulfonyl groups. These sulfonic acid, halosulfonyl or sulfonyl groups can be converted to a sulfonamide group. In the present application the term "support polymer" is used for the polymer not yet comprising such sulfonic acid, halosulfonyl or sulfonyl groups if nothing else is mentioned or evident from the context. Sulfonic acid, halosulfonyl or, sulfonyl groups can be easily introduced by chlorosulfonating the support polymer.

In a first embodiment, the support polymer comprises fluorinated carbon chains with fluoro side chains. Preferably, the support polymer comprises perfluorinated carbon chains with perfluoro side chains. Examples of the support polymer of this first embodiment include, but are not limited to, fluorocarbon vinyl ether polymers such as those disclosed in U.S. Pat. No. 3,282,875. Further examples include crosslinked sulfonic fluorinated ionomers such as those disclosed in EP 1 179 548 A1. Further types of support polymers comprising perfluorinated carbon chains with perfluoro side chains are disclosed in U.S. Pat. No. 4,433,082. Such polymers may comprise the structure [—$CF_2$—$CF_2$—] and/or [—$CF_2$—$CF_2$—O—]. Known examples of perfluorinated support polymers are commercially available polymers of the Nafion® type, e.g., Nafion® 117. Suitable support polymers further include perfluorosulfonic acid (PFSA) polymers as disclosed in Li et al. (2003) Chem. Mater. 15, 4896-4915.

In a second embodiment, the support polymer comprises various polyolefines. Examples include, but are not limited to, PP, LDPE, LLDPE and HDPE, comprising bioriented films.

In a third embodiment, the support polymer comprises one or more aromatic hydrocarbons, preferably aromatic polycondensates. Aromatic hydrocarbons represent a large group of polymers that are low in cost and available commercially. Suitable examples are polyphenylene sulfide (PPS) or polyphenylene oxide (PPO). Further examples include poly (4-phenoxybenzoyl-1,4-phenylene) (PPBP), polyetheretherketones (PEEK), aromatic polysulfones (PSF), polybenzimidazoles such as poly(2,2'-m-phenylene)-5,5'-di-benzimidazole (PBI) or polybenzoxazole and polybenzothiazole. In accordance with the invention there may be used polysulfones (PSU) or polyethersulfones (PES), polyetherketone (PEK), polyethereterketone (PEEK) or polyetheretherketoneketone (PEEKK), polybenzimidazoles (PBI), polyimides (PI), polyphenylenes (PP), poly(4-phenoxybenzoyl-1,4-phenylene) (PPBP), and rigid rod poly(p-phenylenes) (PP), and other polymers (such as polyphenylenesulfide (PPS), polyphenylene oxide (PPO), polybenzazole (PBZ), polythiophenylene, polyphenylquinoxaline, and polyphosphazene. Suitable aromatic polymers and polycondensates are disclosed in Li et al. (2003) Chem. Mater. 15, 4896-4915, which is incorporated herein by reference. Further aromatic support polymers are disclosed in Savadogo (1998) Journal of New Materials for Electrochemical Systems 1, 47-66.

In a fourth embodiment, the support polymer is a radiografted membrane substrate. Radiografting essentially allows a hybrid material to be formed from two completely different materials. For example, polytetrafluoroethylene (PTFE) is a fluoro-polymer known for its stability in many environments up to high temperatures, but is hydrophobic and not ionically conducting. Styrene sulfonic acid is a hydrophilic, acidic monomer. A graft copolymer made up of these two components gives a mechanically strong, insoluble, hydrophilic ion exchange membrane. In the radiation grafting process, one or more monomers are reacted with a base polymer film with the aid of ionizing radiation. Following the grafting step, the newly formed polymer is readily sulfonated.

One of the most common monomers for grafting is styrene with divinylbenzene frequently being added as a crosslinker. Membranes can also be prepared from fluorinated ethylene propylene (FEP) using both the mutual and pre-irradiation grafting techniques. Fluoro polymers such as PTFE, FEP, tetrafluoroethylene-perfluoroalkoxyvinylether (PFA) and ethylenetetrafluoro-ethylene (ETFE) can be reacted with styrene or $\alpha,\beta,\beta$-trifluorostyrene using the pre-irradiation grafting technique. Further radiografted membranes are described in e.g. Horsfall et al. (2002) European Polymer Journal 38, 1671-1682; Huslage et al. (2002) Electrochimica Acta 48, 247-254 or WO 95/07553 A2. These radiografted membranes are incorporated herein by reference.

In a specific embodiment, the support polymer is a non-fluorinated polymer. Suitable non-fluorinated polymers include non-fluorinated aromatic polymers and radiation-grafted polymers as described supra as well as non-aromatic polymers such as polyalkylenes. Examples for a polyalkylene are polyethylene or polypropylene.

The invention further relates to any combination of the above embodiments.

The solid alkaline fuel cell according to the present invention comprises two electrodes and an anion exchange membrane as defined above. Preferably, the electrodes for alkline fuel cells are manufactured by a method of wet fabrication followed by sintering or by a method of dry fabrication through rolling and pressing components into the electrode structure. The electrode generally consists of a hydrophilic catalyzed layer on top of a porous conductive diffusion layer (homogeneous distribution of the fuel and oxidant, respectively), which is in turn bonded to a current collector that is usually metallic. The best results appear to be achieved when the electrode structure is built up from several layers obtainable by, e.g., two-layer fabrication techniques.

Similar to proton exchange membrane fuel cells (PEMFC) and direct methanol fuel cells (DMFC), there is a need to incorporate a specific "electrode binder" (or "ink") on both sides (see "Handbook of Fuel Cells—Fundamentals, Technology and Applications", Vol. 3, chapter 43 "Principles of MEA preparation", solubilized ionomers, and electrode ink formulation). This specific binder (anion exchange ionomer) has to be compatible with the membrane, the catalyst and the fuel type of this special type of fuel cell. As the AEM, the binder has to be chemically stable under SAFC operating conditions, and insoluble in the fuel cell medium.

For non-fluorinated supports, as well as styrene-grafted partially fluorinated supports, suitable binders are polymers of vinylbenzylchloride (VBC) and styrene, quaternized by amination with trimethylamine.

For perfluorinated supports (such as Nafion derived AEM), the binder may be prepared following a similar procedure as used for the AEM preparation. Solutions are prepared by applying the method of EP 1,004,615, or by applying directly the amination to the aqueous precursor (sulfonylfluoride) emulsion resulting from the μ-emulsion or emulsion polymerization. Micro cross-linking may be introduced by use of suitable diamine mixtures.

The architecture of a membrane electrode assembly (MEA) for a SAFC is chosen to allow the generation of electricity. The best choice of components (in particular membrane, catalyst type and catalyst layer structure, diffusion layer structure, binder) may be varied, but will be probably quite different from a DMFC or a PEMFC.

Generally, the catalyst is an efficient catalyst for a fuel cell mode of an electric cell i.e., it is a catalyst that is efficient for oxidation of a specific fuel. Preferably, the catalyst at the cathode is an efficient $O_2$-reduction catalyst Preferably, the catalyst at the anode is an efficient $H_2$-oxidation catalyst More preferably, the catalyst at the anode is capable of efficiently oxidizing alcohols such as methanol, ethanol and/or ethyleneglycol.

Concerning the catalyst, a starting point can be the DMFC type materials: Pt/Ru (1:1) deposited on C-powder (anode), Pt supported on C-powder for the cathode. However, alternative catalyst materials may be considered, both for cost reasons (non noble metals) and for improved activity. As examples, such alternatives may be Ni, Ag or Mn based catalysts. Other routes may be derived from AFC's experience (*McLean* et al, Int. J. Hydrogen Energy 27 (2002), 507-526 "An assessment of alkaline fuel cell technology", p. 512).

Preferably, the ion exchange capacity (IEC, referred to dry membrane) of the ion exchange membrane is>1.8 meq/cc, more preferably>2.0 meq/cc.

The thickness of the ion exchange membrane in SAFC is preferably reduced as compared to generally used membranes in DMFC. The thickness of the dry membrane is preferably<175 μm, more preferably<125 μm, most preferably<100 μm It has surprisingly been found that the presence of alcohol in a SAFC exerts in certain circumstances a highly stabilizing effect on the membrane (shielding of the ammonium groups). Therefore, the preferred fuel is an alcohol, more preferably the fuel is methanol, ethanol or ethylene glycol. The fuel is preferably a liquid fuel.

In Solid Alkaline Fuel Cells (SAFC), there is a net consumption of hydroxide ions due to the neutralization of the reaction products, e.g. oxalic acid or $CO_2$. The fuel cell is usually fed at the anode in a controlled manner by an aqueous solution of alcohol (e.g. ethylene glycol or methanol) with added base (e.g. NaOH, KOH or $Na_2CO_3$), preferably in a stoichiometric ratio of base/alcohol=2:1. Further, the sodium oxalate (or carbonate) produced is usually eliminated from the anode (as a liquid exhaust stream: water, oxalate or carbonate, unconverted fuel). The cathode side generally needs external humidification to the air feed, because water is consumed as a reactant of the oxygen reduction occurring; further reasons are electro-osmotic drag (EOD: hydroxide ion transport through the membrane) and, possibly, the humidification requirements of the membrane. Exhaust stream from the cathode may contain nitrogen, unconverted oxygen, water vapor.

The fuel cell is usually operated at a temperature of at least −20° C., preferably of at least 0° C., more preferably of at least 20° C., most preferably of at least 40° C. The maximum temperature during operation is usually 80° C., preferably 70° C., most preferably 60° C. The upper and lower temperature limits may be combined in any manner to give preferred ranges.

Usually, the fuel cell of the invention when operated at ambient temperature and air oxidant streams (no pressurized system) and feeding a 2M alcohol solution is capable of yielding a maximum power density of at least 25 mW/cm², more preferably of at least 50 mW/cm², most preferably of at least 70 mW/cm².

The common perception of alkaline fuel cells is that they cannot operate if there is any carbon dioxide in the cathode feed gas streams. It has been found that replacement of the liquid, electrolyte used in classical AFC's by the anion exchange membrane overcomes the progressive carbonatation of the electrolyte and electrode failure due to $CO_2$ in the air feed and produced by the anode oxidation reactions of alcohol fuels. Surprisingly it has been further discovered in SAFC operating mode, when using properly selected support polymer, alcohol cross-over is substantially lowered.

The invention further relates to the use of an anion exchange membrane as defined above as an electrolyte in a solid alkaline fuel cell. In yet another aspect, the invention relates to the use of an anion exchange membrane as defined above in a solid alkaline fuel cell for generating electricity. The preferred embodiments described supra with respect to the solid alkaline fuel cell of the invention apply to the uses according to the invention mutatis mutandis.

It has further been found that ion exchange membranes with quaternary ammonium groups that are covalently bonded to special support polymers are very useful as solid electrolytes in solid alkaline fuel cells.

Another aspect of the invention is therefore a monofunctional anion exchange membrane which comprises a non-fluorinated support polymer and groups of formula (I)

covalently bonded to the non-fluorinated support polymer, wherein $Q^+$ is a group comprising at least one quaternized nitrogen atom, and $R^1$ is H or a $C_{1-20}$ alkyl group, or forms a ring together with a group in $Q^+$, wherein the ring contains 2 to 10 carbon atoms and 1 to 4 heteroatoms.

As used herein, the term "monofunctional" means that the membrane is an anion exchange membrane which does not have significant cation exchange function. Preferably, the monofunctional anion exchange membrane has substantially no cation exchange function, most preferably it has no cation exchange function. Accordingly, the membranes of the invention are different from bifunctional ion exchange membranes comprising an anion exchange portion and a cation exchange portion.

Preferably, the monofunctional anion exchange membrane comprises groups of formula (II)

covalently bonded to the non-fluorinated support polymer, wherein

Y is a $C_{6-10}$ aryl group, a heteroaryl group or $CR^7R^8$ wherein $R^7$ is H, a halogen atom or a $C_{1-20}$ alkyl group or forms a ring together with one of $R^2$, $R^5$, or $R^8$, and $R^8$ is H, a halogen atom or a $C_{1-20}$ alkyl group or forms a ring together with one of $R^3$, $R^6$, or $R^7$, each of the rings formed by $R^7$ or $R^8$ containing 2 to 10 carbon atoms and optionally 1 to 4 heteroatoms, and the heteroaryl group contains 5 to 10 ring atoms, $R^1$ is H or a $C_{1-20}$ alkyl group, or forms a ring together with one of $R^2$ or $R^5$, wherein the ring contains 2 to 10 carbon atoms and 1 to 4 heteroatoms, $R^2$ is a $C_{1-20}$ alkyl group or forms a ring together with one of $R^1$, $R^3$, $R^5$, $R^7$ or $R^9$, wherein the ring contains 2 to 10 carbon atoms and 1 to 4 heteroatoms, $R^3$ is a $C_{1-20}$ alkyl group or forms a ring together with one of $R^2$, $R^6$, $R^8$ or $R^{10}$, wherein the ring contains 2 to 10 carbon atoms and 1 to 4 heteroatoms, $R^4$ is a $C_{1-20}$ alkyl group, $R^5$ is H, a halogen atom or a $C_{1-20}$ alkyl group, or forms a ring together with one of $R^1$, $R^2$, $R^7$ or $R^9$, wherein the ring contains 2 to 10 carbon atoms and optionally 1 to 4 heteroatoms, $R^6$ is H, a halogen atom or a $C_{1-20}$ alkyl group, or forms a ring together with one of $R^3$, $R^8$ or $R^{10}$, wherein the ring contains 2 to 10 carbon atoms and optionally 1 to 4 heteroatoms, each $R^9$ is independently H, a halogen atom or a $C_{1-20}$ alkyl group, or forms a ring together with one of $R^2$ or $R^5$, wherein the ring contains 2 to 10 carbon atoms and optionally 1 to 4 heteroatoms, each $R^{10}$ is independently H, a halogen atom or a $C_{1-20}$ alkyl group, or forms a ring together with one of $R^3$ or $R^6$, wherein the ring contains 2 to 10 carbon atoms and optionally 1 to 4 heteroatoms, n is an integer from 0 to 4, and wherein the ring structures in the group of formula (II) can be bridged by $C_{1-4}$ alkylene groups.

Preferred embodiments of the monofunctional anion exchange membrane correspond to the preferred embodiments described supra with respect to the solid alkaline fuel cell of the invention.

It has also been found that specific diamines or polyamines allow for the production of ion exchange membranes that exhibit superior stability properties.

In another embodiment, the invention therefore relates to an anion exchange membrane, comprising a support polymer and groups of formula (III)

(III)

wherein

Y is a $C_{6-10}$ aryl group, a heteroaryl group or $CR^7R^8$ wherein $R^7$ is a halogen atom or a $C_{1-20}$ alkyl group or forms a ring together with one of $R^2$, $R^5$, or $R^8$, and $R^9$ is a halogen atom or a $C_{1-20}$ alkyl group or forms a ring together with one of $R^3$, $R^6$, or $R^7$, each of the rings formed by $R^7$ or $R^8$e containing 2 to 10 carbon atoms and optionally 1 to 4 heteroatoms, and the heteroaryl group contains 5 to 10 ring atoms, $R^1$ is H or a $C_{1-20}$ alkyl group, or forms a ring together with one of $R^2$ or $R^5$, wherein the ring contains 2 to 10 carbon atoms and 1 to 4 heteroatoms, $R^2$ is a $C_{1-20}$ alkyl group or forms a ring together with one of $R^1$, $R^3$, $R^5$, $R^7$ or $R^9$, wherein the ring contains 2 to 10 carbon atoms and 1 to 4 heteroatoms, $R^3$ is a $C_{1-20}$ alkyl group or forms a ring together with one of $R^2$, $R^6$, $R^8$ or $R^{10}$, wherein the ring contains 2 to 10 carbon atoms and 1 to 4 heteroatoms, $R^4$ is a $C_{1-20}$ alkyl group, $R^5$ is H, a halogen atom or a $C_{1-20}$ alkyl group, or forms a ring together with one of $R^1$, $R^2$, $R^7$ or $R^9$, wherein the ring contains 2 to 10 carbon atoms and optionally 1 to 4 heteroatoms, $R^6$ is H, a halogen atom or a $C_{1-20}$ alkyl group, or forms a ring together with one of $R^3$, $R^8$ or $R^{10}$, wherein the ring contains 2 to 10 carbon atoms and optionally 1 to 4 heteroatoms, each $R^9$ is independently H, a halogen atom or a $C_{1-20}$ alkyl group, or forms a ring together with one of $R^2$ or $R^5$, wherein the ring contains 2 to 10 carbon atoms and optionally 1 to 4 heteroatoms, each $R^{10}$ is independently H, a halogen atom or a $C_{1-20}$ alkyl group, or forms a ring together with one of $R^3$ or $R^6$, wherein the ring contains 2 to 10 carbon atoms and optionally 1 to 4 heteroatoms, n is an integer from 0 to 4, and wherein the ring structures in the group of formula (III) can be bridged by $C_{1-4}$ alkylene groups, with the proviso that $R^7$ and $R^8$ are not methyl or ethyl if $R^7=R^8$.

In this embodiment, the support polymer may be perfluorinated, partially fluorinated or non-fluorinated.

These membranes are particularly useful. The preferred embodiments described supra with respect to the solid alkaline fuel cell apply the anion exchange membrane of the invention mutatis mutandis.

The various embodiments described herein may be combined with each other.

The fuel cells of the invention have a high stability in an alkaline medium. Based on the high stability of the sulfonamide link and the great flexibility to introduce sulfonylhalogen groups into various polymer membranes, selected diamines or polyamines can be coupled and alkylated (e.g. methylated) to produce AEM's with optimum support structures (such as styrene grafted partially fluorinated polymers, PE, aromatic hydrocarbon polymers like PSU, PEEK, PI, Nafion family, PBZ, etc.). The membranes described herein exhibit superior ion exchange capacity (IEC), low fuel crossover rate and excellent stability in alkaline medium. They are particularly useful as anion exchange membranes in fuel cells using an alcohol as fuel, e.g. methanol or ethylene glycol.

The invention also concerns a process for the production of a ion exchange membrane according to the invention, the process starting from a membrane constituted from a support polymer being non fluorinated, the polymer having $SO_2R^2$ groups, process wherein a substance of formula (I')

is reacted with the $SO_2R^2$ groups of the polymer in order to produce the groups of formula (I)

wherein $R^1$ s H or a $C_{1-20}$ alkyl group, $R^2$ is a halogen atom and $Q^+$ is a group comprising at least one quaternized nitrogen atom.

The membranes obtained by the process according to the invention are particularly suited for SAFC. They can however have different applications.

In particular, in the process according to the invention, the membrane can be flat or in tubular form The process is particularly suited to produce tubular membranes.

In a preferred embodiment of the process, the reaction of groups (I') with the $SO_2R^2$ groups is operated in controlled conditions in order to occur only in the surface portion of the membrane, the surface portion having a total thickness of at most 30%, preferably 20%, most preferably 10% of the total thickness of the membrane. By total thickness of the surface portion is meant the sum of the thicknesses of the surface layers of both sides of the membrane, if both are reacted with the substance of formula (I'). It is preferred that only one side is reacted. It is recommended that the controlled conditions involve the slowing down of the kinetics of the reaction, through the use of suitable solvents.

Preferably, in this embodiment, the membrane is further put in contact with a strong base, for instance NaOH, in order to convert the unreacted $SO_2R^2$ groups of the remaining portion of the membrane into $SO_3H$ cationic exchange groups. The result is a membrane which has at least an anionic surface layer and a cationic layer, the anionic layer having a thickness of at most 30% of the total thickness of the membrane. Such membrane is useful for separating multivalents cations from protons.

Figure 1:
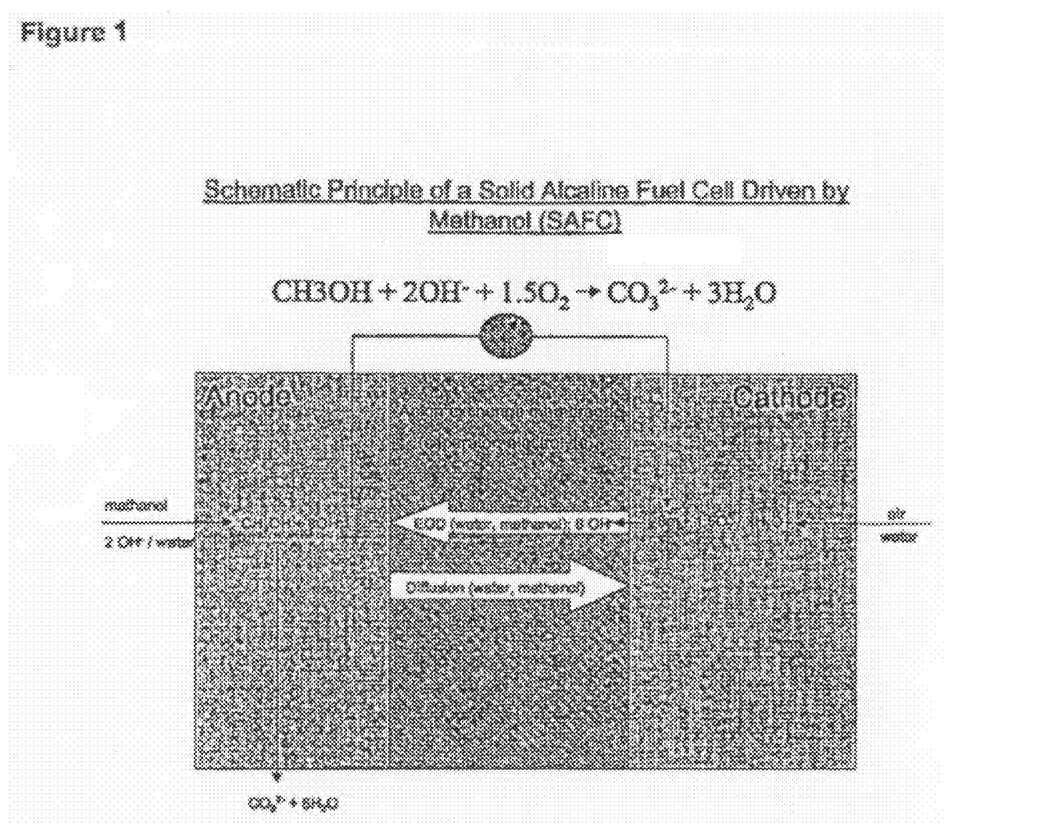

FIG. 1 illustrates the principle of SAFC. The basic reactions in case of methanol as a liquid fuel are shown. The flux of hydroxide ions through the anion exchange membrane occurs from the cathode side to the anode side. The EOD thus is opposed to the diffusion transport process, reducing the net crossover flux.

Figure 2:
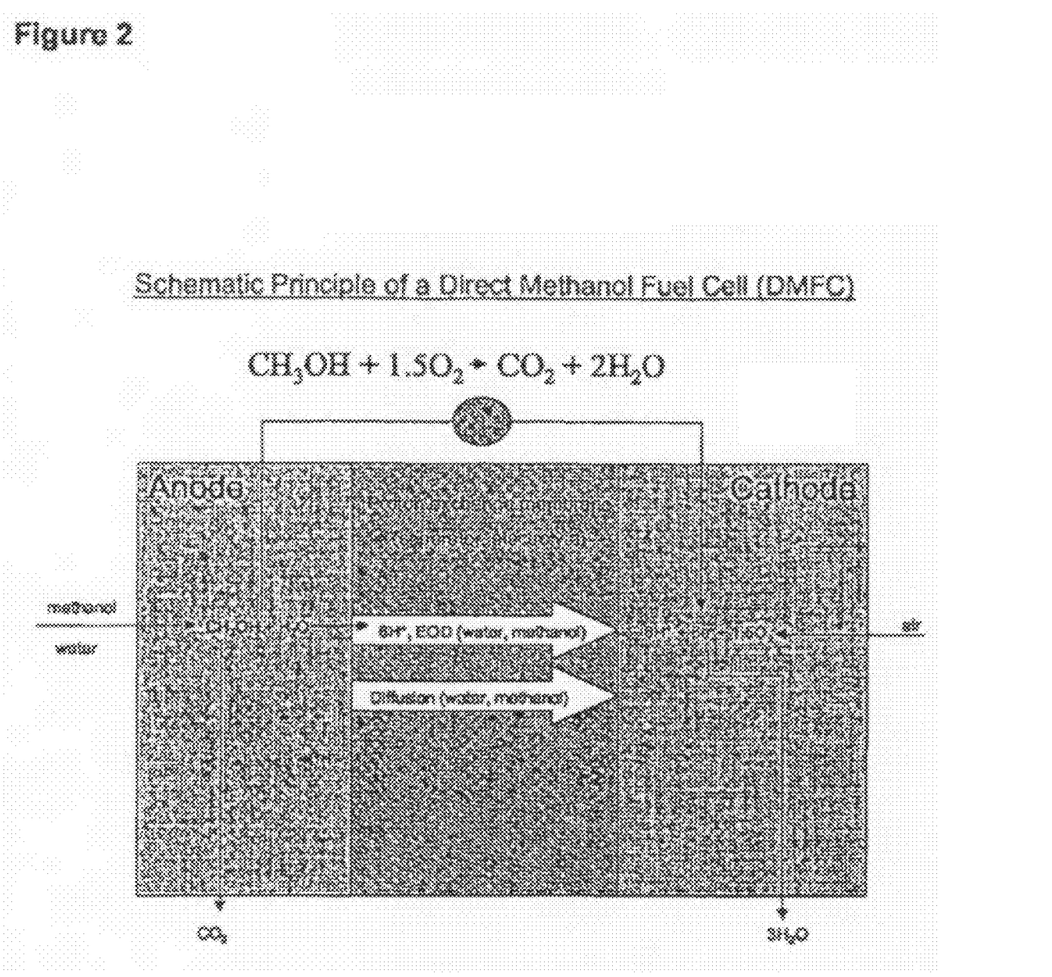

For comparison, FIG. 2 shows the scheme for a DMFC using a proton exchange membrane (PEM) illustrating the fundamentally different operational mode.

Figure 3:
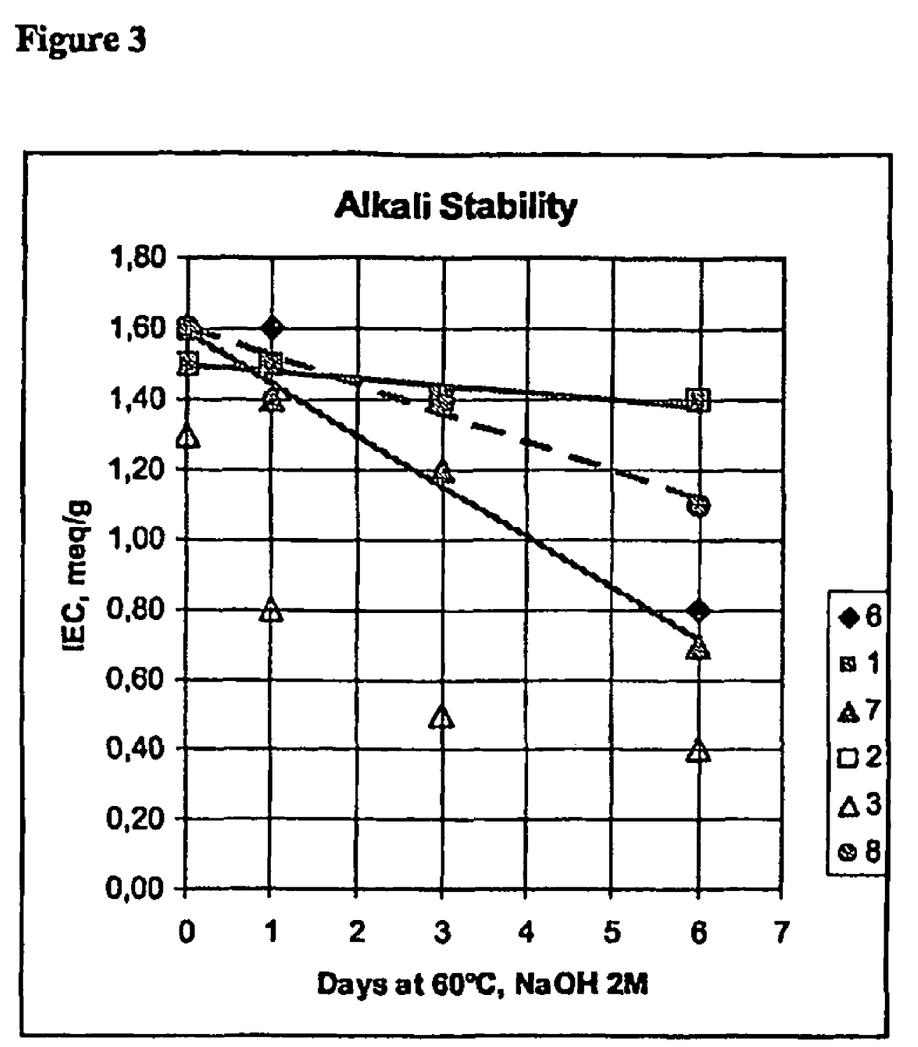

FIG. 3 illustrates the stability in alkaline media of the membranes according to the invention.

The following non-limiting examples further illustrate the invention.

EXAMPLE 1

N,N,2,2-tetramethyl-1,3-propanediamine-ETFE-g-St Support

A 50 μm ETFE film is modified by radio-grafting with a mixture of styrene/divinylbenzene (3% vol) up to a degree of grafting of 50% w.

The grafted copolymer ETFE-g-St (50% w) is then submitted to the following treatment:
1. The film is chlorosulfonated by immersion into a large excess of a 5% vol solution of chlorosulfonic acid (CSA) in 1,2-dichloroethane. The reaction is carried out at 60° C. for 4 hours.
2. The unreacted CSA is extracted with diethylether at room temperature.
3. The chlorosulfonyl function is aminated by contacting the film with a large excess of a 5% vol solution of N,N,2,2-tetramethyl-1,3-propanediamine in acetonitrile, at 60° C. for 16 hours.
4. The aminated film is successively washed at 60° C. with: (1) a solution of 1N NaOH, (2) ethanol
5. The membrane is finally quaternized by exposing it to a large excess of a 1M solution of methyl chloride in a mixture of acetonitrile/water (90/10 vol %) at 60° C. and during 16 h.
6. The membrane is washed by: (1) ethanol, (2) demineralized water. It is stored in a 1% w aqueous solution of NaCl at room temperature.

EXAMPLE 2

N,N,2,2-tetramethyl-1,3-propanediamine-ETFE-g-St Support

A 30 μm ETFE film is modified by radio-grafting with a mixture of styrene/divinylbenzene (3% vol) up to a degree of grafting of 42% w.

The grafted copolymer ETFE-g-St (42%) is then submitted to the following treatment:
1. The film is chlorosulfonated by immersion into a large excess of a 5% vol solution of chlorosulfonic acid (CSA) in 1,2-dichloroethane. The reaction is carried out at 60° C. for 2 hours.
2. The unreacted CSA is extracted with diethyl ether at room temperature.
3. The chlorosulfonyl function is aminated by contacting the film with a large excess of a 5% vol solution of N,N,2,2-tetramethyl-1,3-propanediamine in acetonitrile, at 60° C. for 6 hours.
4. The aminated film is successively washed at 60° C. with: (1) a solution of 1N NaOH, (2) ethanol
5. The membrane is finally quaternized by exposing it to a large excess of a 1M solution of methyl chloride in a mixture of acetonitrile/water (90/10 vol %) at 60° C. and during 16 h.
6. The membrane is washed by: (1) ethanol (2) demineralized water. It is stored in a 1% w aqueous solution of NaCl at room temperature.

EXAMPLE 3

N-methylpiperazine-ETFE-g-St Support

A 30 μm ETFE film is modified by radio-grafting with a mixture of styrene/divinylbenzene (3% vol) up to a degree of grafting of 42% w.

The grafted copolymer ETFE-g-St (42% w) is then submitted to the following treatment:
1. The film is chlorosulfonated by immersion into a large excess of a 5% vol solution of chlorosulfonic acid (CSA) in 1,2-dichloroethane. The reaction is carried out at 60° C. for 2 hours.
2. The unreacted CSA is extracted with diethyl ether at room temperature.
3. The chlorosulfonyl function is aminated by contacting the film with a large excess of a 5% vol solution of N-methylpiperazine in acetonitrile, at, 60° C. for 16 hours.
4. The aminated film is successively washed at 60° C. with: (1) a solution of 1N NaOH, (2) ethanol
5. The membrane is finally quaternized by exposing it to a large excess of a 1M solution of methyl chloride in a mixture of acetonitrile/water (90/10 vol %) at 60° C. and during 16 h.
6. The membrane is washed by: (1) ethanol (2) demineralized water. It is stored in a 1% w aqueous solution of NaCl at room temperature

EXAMPLE 4

N,N-dimethyl-1,3-propanediamine-LDPE Support

A 80 μm LDPE film is chlorosulfonated under the following conditions: The film is swollen in 1,2-dichloroethane at 70° C. for 24 h A 10×10 cm film sample is then placed in a 2.5 L glass reactor. The sample is completely immersed into 1.5 L of 1,2-dichloroethane saturated with gaseous $SO_2$ and $Cl_2$. The saturation is maintained in the course of reaction by feeding continuously the gases.

Initiator is prepared by reacting hydrogen peroxide with 2-butanone dispersed in phosphoric acid. The separated organic phase, after neutralization with $CaCO_3$, is diluted to 1% v in 1,2-dichloroethane Under stirring, radical initiator solution and promotor solution (2% v cobalt naphthenate 53% w solution in white spirit, diluted in 1,2-dichloroethane) are fed, each at a rate of 10 mL/h.

The temperature is maintained between 10-20° C. The reaction is stopped after 8 hours.

The chlorosulfonated LDPE film is exhaustively washed with 1,2-dichloroethane, then with ethanol. The film shows no sign of degradation.

The chlorosulfonated LDPE film is then submitted to the following treatment:
1. The chlorosulfonyl function is aminated by contacting the film with a large excess of pure N,N-dimethyl-1,3-propanediamine, at 60° C. for 16 hours.
2. The aminated film is successively washed at 60° C. with: (1) a solution of 1N NaOH, (2) ethanol
3. The membrane is finally quaternized by exposing it to a large excess of a 2M solution of methyl chloride in acetonitrile, at 60° C. and during 16 h.
4. The membrane is washed by: (1) ethanol, (2) demineralized water. It is stored in a 1% w aqueous solution of NaCl at room temperature

EXAMPLE 5

N,N-dimethyl-1,3-propanediamine-Hyflon® Ion Precursor Support

Hyflon® Ion precursor is a copolymer of tetrafluoroethylene and perfluoro-5-sulphonylfluoride-3-oxa-1-pentene.

A 160 µm Hyflon® Ion precursor film (fluorosulfonyl groups EW 900) is submitted to the following treatment:
1. The fluorosulfonyl function is aminated by contacting the film with a large excess of pure N,N-dimethyl-1,3-propanediamine, at 60° C. for 1 hour.
2. The aminated film is successively washed at 60° C. with: (1) a solution of 1N NaOH, (2) ethanol
3. The membrane is finally quaternized by exposing it to a large excess of a 1M solution of methyl chloride in a mixture of acetonitrile/water (90/10 vol %) at 60° C. and during 16 h
4. The membrane is washed by: (1) ethanol, (2) demineralized water, (3) NaCl 1% w, 16 h. It is stored in a 1% w aqueous solution of NaCl at room temperature

EXAMPLE 6

N,N-dimethyl-1,3-propanediamine-ETFE-g-St Support

A 50 µm ETFE film is modified by radio-grafting with a mixture of styrene/divinylbenzene (3% vol) up to a degree of grafting of 50% w.

The grafted copolymer ETFE-g-St (50% w) is then submitted to the following treatment:
1. The film is chlorosulfonated by immersion into a large excess of a 5% vol solution of chlorosulfonic acid (CSA) in 1,2-dichloroethane. The reaction is carried out at 60° C. for 4 hours.
2. The unreacted CSA is extracted with diethylether at room temperature.
3. The chlorosulfonyl function is aminated by contacting the film with a large excess of a 5% vol solution of N,N-dimethyl-1,3-propanediamine in acetonitrile, at 60° C. for 16 hours.
4. The aminated film is successively washed at 60° C. with: (1) a solution of 1N NaOH, (2) ethanol 5. The membrane is finally quaternized by exposing it to a large excess of a 1M solution of methyl chloride in a mixture of acetonitrile/water (90/10 vol %) at 60° C. and during 16 h
6. The membrane is washed by: (1) ethanol, (2) demineralized water. It is stored in a 1% w aqueous solution of NaCl at room temperature.

EXAMPLE 7

N,N-dimethyl-1,3-propanediamine-ETFE-g-St Support

A 30 µm ETFE film is modified by radio-grafting with a mixture of styrene/divinylbenzene (3% vol) up to a degree of grafting of 42% w.

The grafted copolymer ETFE-g-St (42% w) is then submitted to the following treatment:
1. The film is chlorosulfonated by immersion into a large excess of a 5% vol solution of chlorosulfonic acid (CSA) in 1,2-dichloroethane. The reaction is carried out at 60° C. for 4 hours.
2. The unreacted CSA is extracted with diethylether at room temperature.
3. The chlorosulfonyl function is aminated by contacting the film with a large excess of a 5% vol solution N,N-dimethyl-1,3-propanediamine in acetonitrile, at 60° C. for 16 hours.
4. The aminated film is successively washed at 60° C. with: (1) a solution of 1N NaOH, (2) ethanol
5. The membrane is finally quaternized by exposing it to a large excess of a 1M solution of methyl chloride in a mixture of acetonitrile/water (90/10 vol %) at 60° C. and during 16 h.
6. The membrane is washed by: (1) ethanol, (2) demineralized water. It is stored in a 1% w aqueous solution of NaCl at room temperature.

EXAMPLE 8

Trimethylamine-ETFE-g-VBC Support

A 50 µm ETFE film is modified by radio-grafting with a mixture of Vinylbenzylchloride (30% vol) and Divinylbenzene (3% vol) in ethanol up to a degree of grafting of 50% w.

The chlorobenzyl functions (—CH$_2$Cl) are then modified into —CH$_2$(N(CH$_3$)$_3$)+ functions, by contacting the film with a large excess of an aqueous solution of trimethyl amine. Finally, the membrane is immersed in an aqueous solution of NaCl 10 g/l, at 60° C.

The ion exchange capacity (IEC), water uptake, electrical resistance and stability in alkline media of the membranes prepared in Examples 1 to 8 have been determined in the following way:

Ion Exchange Capacity

The membrane is equilibrated successively by: (1) solution NaOH 0.5M, (2) demineralized water, (3) NaCl 0.6M—demineralized water. Quantitative analysis of the OH$^-$ ions in the NaCl solution in equilibrium with the membrane allows to determine the ion exchange capacity: IEC=$n_{OH^-}/m_d$ (meq/g). $n_{OH^-}$: mmol OH$^-$ ions present in the solution; $m_d$: weight of dry membrane. The EIC on a volume basis is calculated by multiplying the weight EIC by the dry membrane specific mass.

Water Uptake

Weight of water absorbed by the membrane (Cl⁻ counter-ion) at equilibrium with demineralized water at 20° C. The water uptake is expressed in g water per g dry membrane.

Stability in Alkaline Media

The ion exchange capacity of the membranes have been compared, before and after a stay of 1, 3 or 6 days in sodium hydroxide 2M, used pure or in mixture with methanol 1M or ethyleneglycol 1M.

The results are shown in the following tables and in FIG. 3.

TABLE 1

Membrane Properties

| | Example | | | | | | | |
|---|---|---|---|---|---|---|---|---|
| | 1 | 2 | 3 | 4 | 5 | 6 | 7 | 8 |
| IEC (meq/g) | 1.6 | 1.5 | 1.3 | | 0.9 | 1.6 | 1.6 | 1.6 |
| IEC (meq/cc) | 2.1 | 2.1 | 1.8 | | 1.9 | 2.1 | 2.2 | 2.2 |
| Thickness (μm) | 100 | 55 | 55 | 80 | 160 | 100 | 55 | 75 |
| Electrical resistance (NaCl, 1% w, 20° C.) (Ω · cm²) | 2.2 | 1.0 | 1.0 | 1.8 | 2.8 | 1.5 | 0.9 | 1.7 |
| Electrical resistance (NaOH, 1N, 20° C.) (Ω · cm²) | 0.23 | 0.1 | 0.1 | | | 0.19 | 0.1 | 0.20 |
| Conductivity (NaOH, 1N, 20° C.) (mS/cm) | 44 | 55 | 55 | | | 50 | 55 | 38 |

TABLE 2

Membrane stability in alkaline media, 60° C. - IEC (meq/g)

| | | Example - IEC (meq/g) | | | | | |
|---|---|---|---|---|---|---|---|
| Treatment | | 6 | 1 | 7 | 2 | 3 | 8 |
| None | | 1.6 | 1.5 | 1.6 | 1.5 | 1.3 | 1.6 |
| NaOH 2M | 1 day | 1.6 | 1.4 | 1.4 | 1.5 | 1.8 | 1.5 |
| | 3 days | 1.4 | 1.4 | 1.2 | 1.4 | 0.5 | 1.4 |
| | 6 days | 0.8 | 1.4 | 0.7 | 1.4 | 0.4 | 1.1 |
| NaOH 2M, CH₃OH 1M | 1 day | 1.6 | 1.5 | 1.4 | 1.5 | 0.7 | 1.5 |
| | 3 days | 1.5 | 1.4 | 1.3 | 1.5 | 0.3 | 1.4 |
| | 6 days | 1.3 | 1.3 | 1.0 | 1.4 | 0.2 | 1.2 |
| NaOH 2M, (CH₂OH)₂ 1M | 1 day | 1.5 | 1.5 | 1.4 | 1.5 | 0.7 | 1.5 |
| | 3 days | 1.5 | 1.4 | 1.4 | 1.5 | 0.3 | 1.4 |
| | 6 days | 1.2 | 1.4 | 1.0 | 1.4 | 0.2 | 1.4 |

Table 2 and FIG. 3 demonstrate the improved stability of anion exchange membranes prepared with N,N,2,2-tetramethyl-1,3-propanediamine (examples 1 and 2) as compared to N,N-dimethyl-1,3-propane diamine (examples 6 and 7) and to N-methyl piperazine (example 3). Example 8, prior art type membrane, is inferior to examples 1 and 2 (the invention), both for stability in NaOH and for ionic conductivity.

The favorable effect of the presence of methanol or ethylene glycol on the stability of the anion exchange membranes is also demonstrated (table 2).

The invention claimed is:

1. A solid alkaline fuel cell comprising a fuel and an anion exchange membrane which comprises a support polymer and groups of formula (I)

$$—SO_2—NR^1-Q^+ \quad (I)$$

covalently bonded to the support polymer, wherein

Q+ is a group comprising at least one quaternized nitrogen atom, and $R^1$ is H or a $C_{1-20}$ alkyl group, or forms a ring together with a group in $Q^+$, wherein the ring contains 2 to 10 carbon atoms and 1 to 4 heteroatoms, wherein said fuel is an alcohol, and wherein the group of formula (I) has the following structure:

wherein

Y is $CR^7R^8$ wherein $R^7$ and $R^8$ independently are a halogen atom or a $C_{1-20}$ alkyl group, $R^1$ is H or a $C_{1-20}$ alkyl group, or forms a ring together with one of $R^2$ or $R^5$, wherein the ring contains 2 to 10 carbon atoms and 1 to 4 heteroatoms, $R^2$ is a $C_{1-20}$ alkyl group or forms a ring together with one of $R^1$, $R^3$, $R^5$, $R^7$ or $R^9$, wherein the ring contains 2 to 10 carbon atoms and 1 to 4 heteroatoms, $R^3$ is a $C_{1-20}$ alkyl group or forms a ring together with one of $R^2$, $R^6$, $R^8$ or $R^{10}$, wherein the ring contains 2 to 10 carbon atoms and 1 to 4 heteroatoms, $R^4$ is a $C_{1-20}$ alkyl group, $R^5$ is H, a halogen atom or a $C_{1-20}$ alkyl group, or forms a ring together with one of $R^1$, $R^2$, $R^7$ or $R^9$, wherein the ring contains 2 to 10 carbon atoms and optionally 1 to 4 heteroatoms, $R^6$ is H, a halogen atom or a $C_{1-20}$ alkyl group, or forms a ring together with one of $R^3$, $R^8$ or $R^{10}$, wherein the ring contains 2 to 10 carbon atoms and optionally 1 to 4 heteroatoms, each $R^9$ is independently H, a halogen atom or a $C_{1-20}$ alkyl group, or forms a ring together with one of $R^2$ or $R^5$, wherein the ring contains 2 to 10 carbon atoms and optionally 1 to 4 heteroatoms, each $R^{10}$ is independently H, a halogen atom or a $C_{1-20}$ alkyl group, or forms a ring together with one of $R^3$ or $R^6$, wherein the ring contains 2 to 10 carbon atoms and optionally 1 to 4 heteroatoms, n is an integer from 0 to 4, and wherein the ring structures in the group of formula (II) can be bridged by $C_{1-4}$ alkylene groups.

2. A solid alkaline fuel cell according to claim 1, wherein $R^1$ is H or a $C_{1-20}$ alkyl group, $R^2$, $R^3$ and $R^4$ independently are a $C_{1-20}$ alkyl group, $R^5$ and $R^6$ are H, $R^9$ or $R^{10}$ are H, and n is an integer from 0 to 2.

3. A solid alkaline fuel cell according to claim 1, wherein Y is $CR^7R^8$, and $R^7$ and $R^8$ independently are F or Cl.

4. A solid alkaline fuel cell according to claim 1, wherein Y is $CR^7R^8$, and $R^7$ and $R^8$ independently are methyl, ethyl or propyl.

5. A solid alkaline fuel cell according to claim 1, wherein $(CR^9R^{10})_n$ in formula II is a methylene or ethylene group.

6. A solid alkaline fuel cell according to claim 1, wherein the support polymer comprises perfluorinated carbon chains with perfluoro side chains.

7. A solid alkaline fuel cell according to claim 1, wherein the support polymer comprises at least one aromatic hydrocarbon.

8. A solid alkaline fuel cell according to claim 7 wherein the support polymer comprises a polybenzimidazole.

9. A solid alkaline fuel cell according to claim 1, wherein the alcohol is methanol.

10. A solid alkaline fuel cell according to claim 1, wherein the alcohol is ethylene glycol.

* * * * *